(12) United States Patent
Mejia

(10) Patent No.: US 7,325,542 B2
(45) Date of Patent: Feb. 5, 2008

(54) HEATING AND COOLING SYSTEM

(76) Inventor: Raymundo Mejia, 3059 E. Cardinal St., Anaheim, CA (US) 92806

( * ) Notice: Subject to any disclaimer, the term of this patent is extended or adjusted under 35 U.S.C. 154(b) by 449 days.

(21) Appl. No.: 11/143,450

(22) Filed: Jun. 3, 2005

(65) Prior Publication Data
US 2005/0279347 A1   Dec. 22, 2005

Related U.S. Application Data

(60) Provisional application No. 60/577,192, filed on Jun. 7, 2004.

(51) Int. Cl.
*F24J 2/40* (2006.01)
(52) U.S. Cl. ...................... 126/605; 126/572
(58) Field of Classification Search ............... 126/605, 126/572, 573, 574, 575, 576, 577, 600, 621
See application file for complete search history.

(56) References Cited

U.S. PATENT DOCUMENTS

| | | |
|---|---|---|
| 3,011,424 A | 12/1961 | Kohnen |
| 3,985,119 A | 10/1976 | Oakes, Jr. |
| 4,002,031 A | 1/1977 | Bell |
| 4,068,652 A | 1/1978 | Worthington |
| 4,080,221 A | 3/1978 | Manelas |
| 4,111,360 A | 9/1978 | Barr |
| 4,215,551 A | 8/1980 | Jones |
| 4,271,824 A | 6/1981 | Decker, III |
| 4,332,114 A | 6/1982 | Goebel et al. |
| 4,389,827 A | 6/1983 | Van Valkenburg |
| 4,403,600 A | 9/1983 | Morrison et al. |
| 4,421,097 A | 12/1983 | Meckler |
| 4,497,311 A | 2/1985 | Brandenburg, Jr. |
| 4,643,246 A | 2/1987 | Ikemura et al. |
| 4,788,805 A | 12/1988 | Shaw |
| 5,046,329 A | 9/1991 | Travis, III |
| 5,344,361 A | 9/1994 | Matthias |
| 5,433,660 A | 7/1995 | Ohba |
| 6,080,927 A | 6/2000 | Johnson |

(Continued)

FOREIGN PATENT DOCUMENTS

| | | |
|---|---|---|
| DE | 39 42 865 A1 | 6/1991 |
| GB | 2 279 452 A | 1/1995 |
| JP | 6-257808 A | 9/1994 |
| JP | 6-272920 A | 9/1994 |

*Primary Examiner*—Alfred Basichas
(74) *Attorney, Agent, or Firm*—Richard C. Litman

(57) ABSTRACT

A heating and cooling system for an enclosure includes a positionable solar panel assembly that supplies power to all the power consuming components of the system. A mountable sun tracking assembly continuously detects the position of the sun and adjusts the position of the solar panels to follow the movement of the sun during the day and to reposition the solar panels in the evening to receive the morning sun the following day. One or more ventilation assemblies mountable in one or more openings in the enclosure controllably supplies heated or cooled air into the enclosure, evacuating inside air, re-circulating inside air, and/or circulating outside air in response to control signals from the sun tracking assembly. A control box mounted inside the enclosure selectively controls operation and testing of the system. A dome is provided as an aesthetic covering for the ventilation assembly.

18 Claims, 12 Drawing Sheets

U.S. PATENT DOCUMENTS

| | | |
|---|---|---|
| 6,435,293 B1 | 8/2002 | Williams |
| 6,454,178 B1 * | 9/2002 | Fusco et al. ............... 236/49.3 |
| 6,630,622 B2 | 10/2003 | Konold |
| 6,695,692 B1 | 2/2004 | York |
| 2002/0121298 A1 | 9/2002 | Konold |
| 2003/0013405 A1 | 1/2003 | Guilford, Sr. |

* cited by examiner

HEATING AND COOLING SYSTEM

CROSS-REFERENCE TO RELATED APPLICATION

This application claims the benefit of U.S. Provisional Patent Application Ser. No. 60/577,192, filed Jun. 7, 2004, which is incorporated herein by reference.

BACKGROUND OF THE INVENTION

1. Field of the Invention

The present invention relates to heating and cooling systems. More specifically, the invention relates to a heating and cooling system for adjustably controlling the inside temperature of an enclosure, such as a home, building, office, ship, vehicle, aircraft, shipping container, or the like, using solar power.

2. Description of the Related Art

Solar-powered heating and/or cooling systems have been the subject matter of many patents in the past. For example, German Patent Application Publication No. DE 39 42 865 A1, published Jun. 6, 1991, describes an airflow control device for a greenhouse having LV axial blowers and a tiltable control flap driven by a crank on a servomotor. The system includes a first ventilator unit mounted in a rectangular box with two or more axial blowers and a power unit. The power unit is in the form of a battery that is charged by a solar panel positioned on the roof of the greenhouse. An electronic control unit operates the blowers and the motor for the tiltable flap of the ventilator. A second ventilator unit is provided with only a control flap for controlling the inlet flow of fresh air into the greenhouse. Power for the blowers and motor is provided by the solar panel. The device of Kuehner et al. has no provisions for further heating or cooling of the air in the greenhouse.

Japan Patent Application Publication No. JP 6-272920 A, published Sep. 27, 1994, describes a device for providing a home or other dwelling with stable and positive ventilation. The device includes a solar cell mounted on the roof of the house and a ventilation device constructed with a forced ventilation port and a natural ventilation port. A fan driven by the solar cell is installed in the ventilation port. The device provides forced ventilation during the day and natural ventilation at night. This device also has no provisions for further heating or cooling of the air within the dwelling.

U.S. Pat. No. 6,692,130 B1, issued Feb. 17, 2004 to Christopher E. Snow, describes a solar-powered heating and cooling system for vehicles. The system includes a duct system mounted on a ceiling of the vehicle. The duct system is provided with a fan, a heater, a first vent for accepting air from the interior of the vehicle. Second and third vents are provide in the duct system for circulating air from the first vent back into the interior of the vehicle for heating the interior air and for exhausting air from the first vent to the exterior of the vehicle for cooling the interior of the vehicle. A power control circuit accepts power from the vehicle battery or a solar panel mounted on the vehicle windshield and decides which source will be used to supply power to the fan, heater. The control circuit is connected to a selector switch that allows a user to select between heating and cooling functions. The switch also controls actuation of the vent flaps. Snow fails to teach the use of any means for further cooling of the interior air of the vehicle by the heating and cooling system.

U.S. Pat. No. 4,497,311, issued Feb. 5, 1985 to Frank J. Brandenburg, Jr., describes a sun tracking solar air-heating system having a solar collector with a reversible motor and gearing arrangement. Timers control operation of the motor for pivoting the solar collector about a vertically inclined axis relative to the horizon for tracking the sun across the sky from sun up to sundown and returning the solar collector to an original position during the nighttime. A flexible duct system is connected with the solar collector and extends through the roof for communication with the space to be heated.

None of the above inventions and patents, taken either singly or in combination, is seen to describe the instant invention as claimed.

SUMMARY OF THE INVENTION

The present invention is a heating and cooling system provided in the form of a plurality of assembly components interconnected to adjustably control the inside temperature of any desired enclosure, such as a home, building, office, ship, vehicle, aircraft, shipping container, or the like, using solar power. The heating and cooling system includes a positionable solar panel assembly having a plurality of solar panels. The solar panel assembly is configured to supply power to power consuming components of the heating and cooling system. A sun tracking assembly is interconnected to the solar panel assembly. The sun tracking assembly is configured to continually detect a position of the sun and provide control signals to adjust a position of the plurality of solar panels of the solar panel assembly to follow the movement of the sun during a day, and to reposition the plurality of solar panels for following the sun a subsequent day. One or more ventilation assemblies is configured to controllably supply heated and cooled air into the enclosure, evacuate air from the enclosure, re-circulate air from the enclosure, and/or circulate outside air through the enclosure in response to control signals from the sun tracking assembly. A system control is interconnected to the solar panel assembly and the sun tracking assembly. The system control is configured to selectively control operation and testing of the at least one ventilation assembly, and is configured to operate in an OFF, AUTO, SMART AIR, WARM AIR, and/or COOL AIR mode selection.

The heating and cooling system can have a dome attachable to the ventilation assembly(s) to provide an aesthetic covering for the ventilation assembly(s). The solar panel assembly has a solar panel mounting frame with a bottom side and an elongated rectangular metal frame member having corner flanges, a bottom side, and a topside. The bottom side of the frame member is pivotally attached to the bottom side of the solar panel mounting frame.

Each solar panel of the plurality of solar panels has an upper end, a lower end, and opposing sides. A first linking bar is pivotally interconnected with one side of a lower end of each solar panel of the plurality of solar panels. A second linking bar is pivotally interconnected to the opposing side of upper end of each solar panel of the plurality of solar panels. Each solar panel of the plurality of solar panels has a snap-on rear surface for spilling wind in areas having high winds.

The heating and cooling system can have a first repositioning motor with a drive gear, where the first repositioning motor is affixed to the mounting frame. One of the plurality of solar panels has a hemispherical gear centrally affixed the rear surface of the one solar panel. The hemispherical gear meshes with the drive gear of the first positioning motor to cause the plurality of solar panels to pivot back and forth in response to actuation of the first positioning motor to follow daily movements of the sun.

The heating and cooling system can have a second repositioning motor affixed to the mounting frame. One of the plurality of solar panels has a hemispherical gear centrally affixed the rear surface of the one solar panel. The hemispherical gear meshing with the drive gear of the second positioning motor to cause the plurality of solar panels to pivot back and forth in response to actuation of the first positioning motor to follow daily movements of the sun.

The system control has a processing unit that can be a programmable micro-processing chip. The processing unit is configured to provide drive signals to positional motors for moving the solar panels and mounting frame in response to detected positions of the sun. The heating and cooling system can have an indoor air temperature sensor, an outdoor temperature sensor, inside and outside blinds, vent doors, a fan, a pump, a heater, and test lights.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
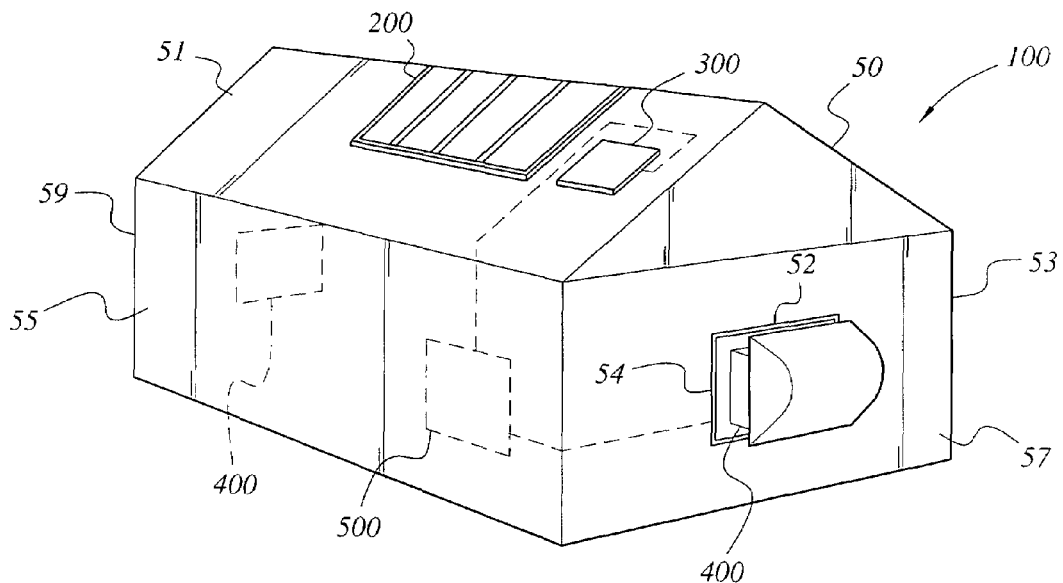
FIG. 1 is an environmental, perspective view of the heating and cooling system according to the present invention in place on a typical dwelling.

The present invention is a heating and cooling system. The invention disclosed herein is, of course, susceptible of embodiment in many different forms. Shown in the drawings and described herein below in detail are preferred embodiments of the invention. It is to be understood, however, that the present disclosure is an exemplification of the principles of the invention and does not limit the invention to the illustrated embodiments.

The present invention is a solar powered heating and cooling system for inside temperature of a desired enclosure, such as a home, building, office, warehouse, farmhouse, ship, vehicle, aircraft, shipping container, or the like, using solar power buildings such as homes, warehouses, farmhouses, etc. FIG. 1 shows the solar powered heating and cooling system 100 installed on an enclosure configured as a typical house 50 having a roof 51, a northern sidewall 53, a southern sidewall 55, an eastern end wall 57, and a western end wall 59. The heating and cooling system 100 is provided in the form of a plurality of assembly components interconnected to adjustably control the inside temperature of any desired enclosure, such as a home, building, office, farmhouse, ship, vehicle, aircraft, shipping container, or the like, using solar power.

The system 100 includes a roof mountable or back yard positionable solar panel assembly 200 for supplying system power to all the power consuming components of the system mounted on the roof 51 of a house 50. A roof mountable sun tracking assembly 300 is mounted upon the roof 51 for continually detecting the position of the sun and adjusting the position of the solar panels of the solar panel assembly 200 to follow the movement of the sun during the day. Sun tracking assembly 300 also repositions the panels after sunset for following the sun the next day. One ventilation assembly 400 is mounted in wall 57. A second ventilation system 400 is mounted in wall 59. The ventilation assemblies 400 supply heated or cooled filtered air to the interior of the building, exhausting air from the interior of the building or re-circulating the air within the building in response to signals from the sun tracking assembly 300. A control box assembly 500 is mounted on an interior wall of the house 50 to control operation of the heating and cooling system 100. In addition, a dome 600 is provided as an aesthetic covering for the ventilation assembly.

Figure 2:
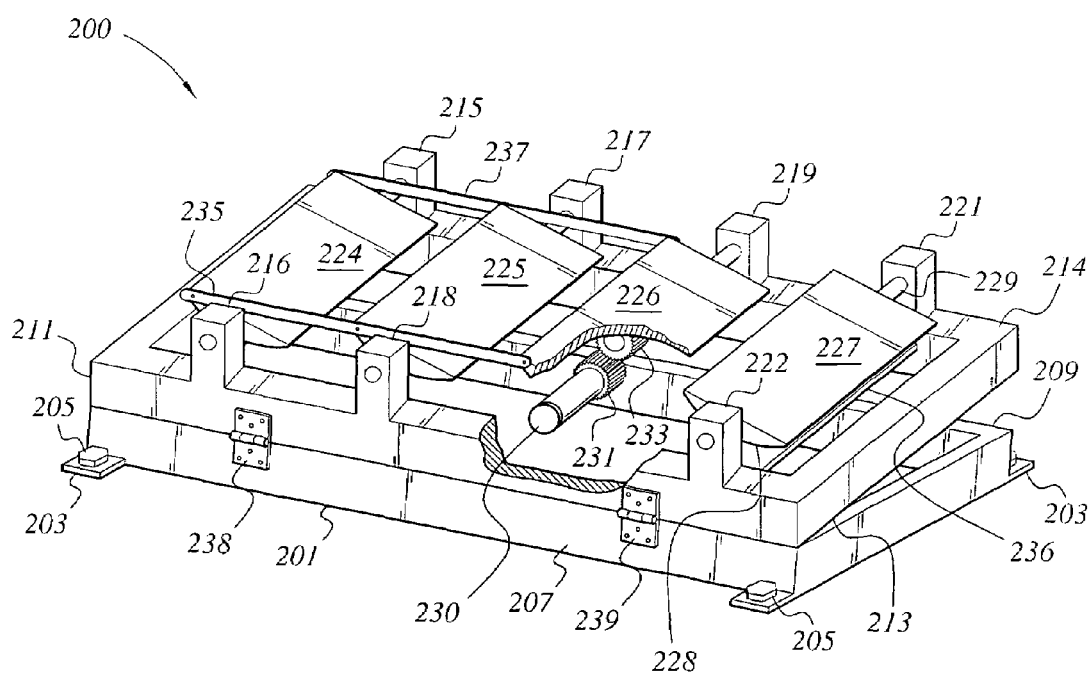
FIG. 2 is a perspective view of a solar panel assembly of the heating and cooling system according to the present invention.

Turning now to FIG. 2, the positionable solar panel assembly 200 includes an elongated rectangular metal frame member 201 having corner flanges 203 for securing frame member 201 to the roof 51 of house 50 with bolts 205 or a similar setup for securing frame member 201 to the ground. Frame member 201 has a bottom side 207 and topside 209. The bottom side 207 of frame member 201 is pivotally attached by hinges 238 and 239 or any other suitable pivotal connecting arrangement to a bottom side of a solar panel mounting frame 211. The solar panel mounting frame 211 is an elongated metal frame symmetrical with frame member 201. Frame 211 includes a bottom surface 213 and a top surface 214.

A plurality of posts 215-222 extend perpendicularly from the top surface 214 of frame 211. The posts are arranged in pairs along frame 211 to pivotally support the axles 229 of solar panels 224-227. Solar panels 224-227 are generally rectangular and include a snap-on rear surface 228 provided with an aerodynamic shape for spilling the wind in areas having high winds. One side of a lower end of each solar panel 224-226 is pivotally connected to a separate portion of a first linking bar 235. One side of the upper end of each solar panel 224-226 is pivotally connected to a separate portion of a second linking bar 237. From the above-described arrangement, it can be seen that panels 224-226 are connected such that they pivotally move together. To move solar panels 224-226 a first positioning motor 230 is affixed to frame 211 by a bracket (not shown). A hemispherical gear 233 is centrally affixed to the rear surface 228 of solar panel 226. A drive gear 231 of motor 230 meshes with gear 233 and causes panels 224-226 to pivot back and forth in response to actuation of motor 230 to follow the daily movements of the sun.

Figure 3:
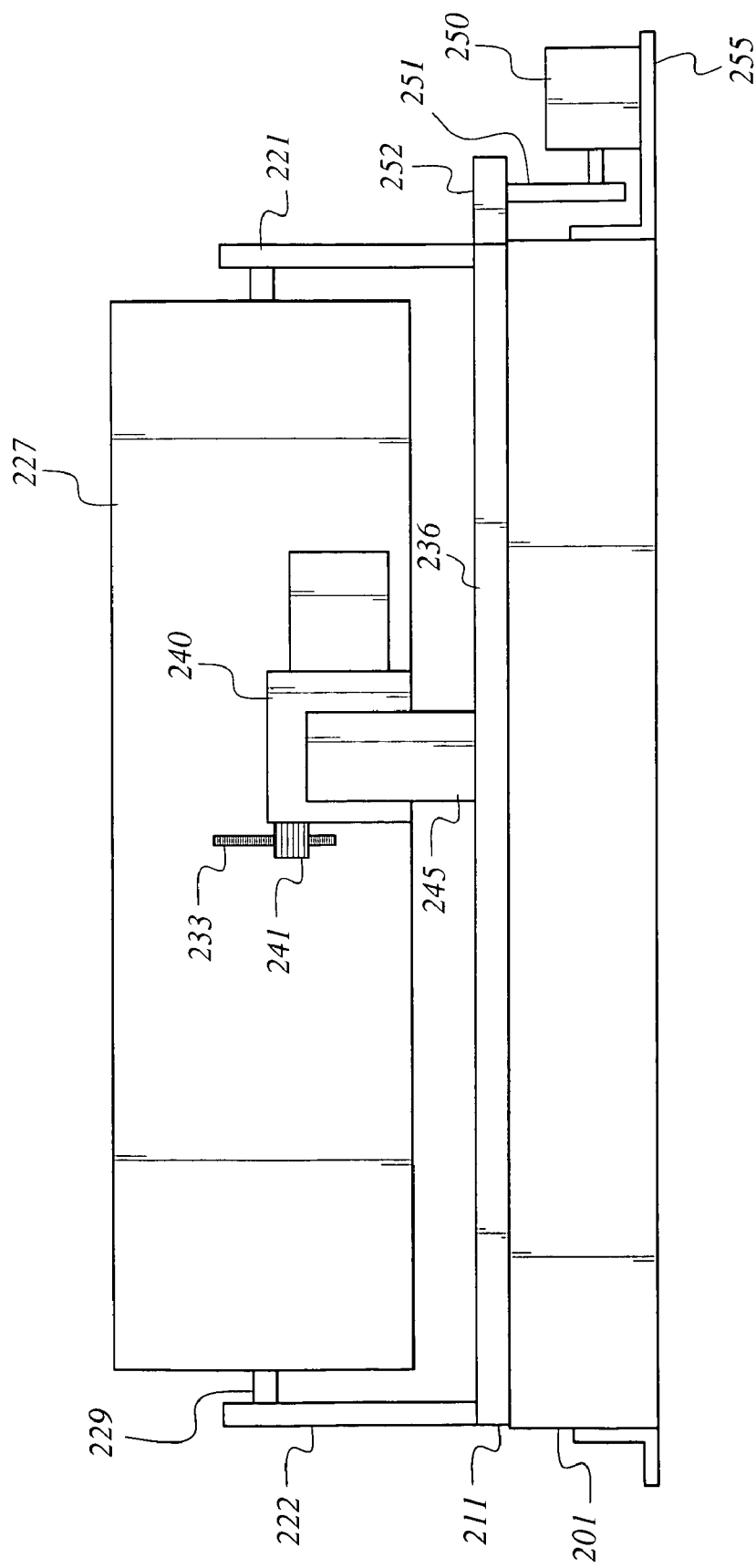
FIG. 3 is a rear view of a motor driven solar panel of the solar panel assembly of the heating and cooling system according to the present invention.
Figure 4:
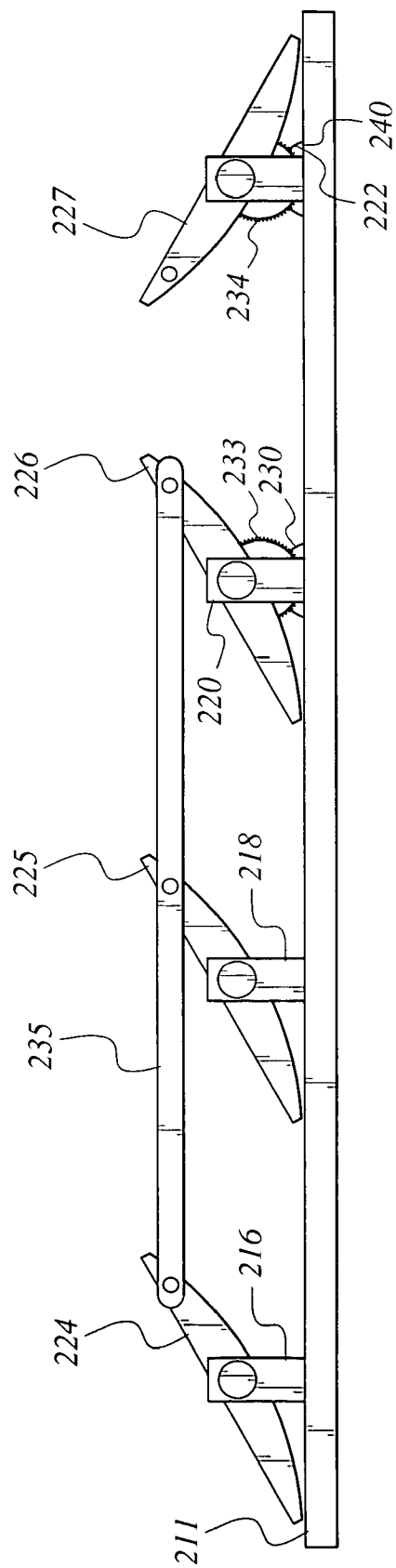
FIG. 4 is a side view of the solar panel assembly of the heating and cooling system according to the present invention.

As best shown in FIGS. 3 and 4, frame 211 includes a first motor bracket 245 attached to a crossbar 236 (not shown) between topside 214 and bottom side 213 of the frame 211. A second repositioning motor 240 is secured to bracket 245. The drive gear 241 of motor 240 meshes with hemispherical gear 233 of panel 227 for pivoting panel 227 to follow the daily movement of the sun. Panel 227 provides power from the evening sun to positional motor 230 to reposition panels 224-226 to receive the light of the morning sun. Panels 224-226 provide power from the morning sun for driving positional motor 240 to reposition panel 227 to receive the light of the morning sun.

An extended flange 252 is formed on topside 214 of frame 211 adjacent to a motor bracket 255 attached to topside 209 of frame member 201. A seasonal positioning motor 250 is mounted on bracket 255 and has cam 251 affixed to an end of the driveshaft. The cam 251, as illustrated in FIG. 3, is provided in the form of a bar. An end of the bar engages the flange 252 in response to rotation of motor 250 to move the topside 214 of frame 211 toward and away from topside 209 of frame member 201. Cam 251 can be provided in other shapes suitable for changing the angle of frame 211 relative frame member 201. Frame 211 pivots about the axis of hinges 238 and 239 so that the solar panels 224-227 also follow the seasonal movements of the sun.

Figure 5:
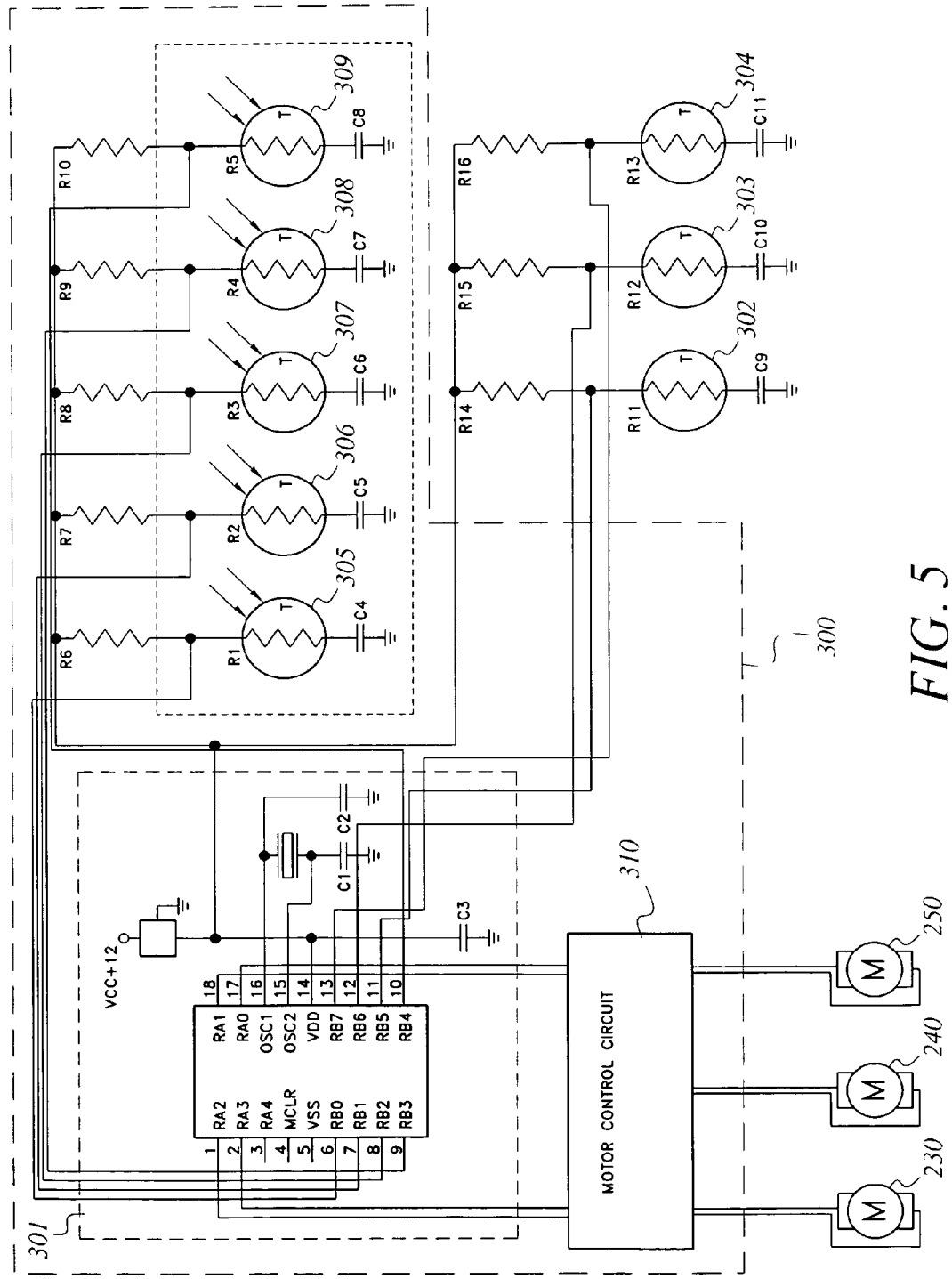
FIG. 5 is a schematic representation of the solar panel positioning system of the heating and cooling system according to the present invention.

A partial electrical circuit diagram for the sun tracking assembly 300 is shown in FIG. 5. A processing unit 301 receives sun position signals from sun position detectors 305-309 and produces control signals that are fed to a motor control circuit 310. The processing unit 301 may be provided in the form of any suitable commercially available programmable micro-processing chip preferably a PIC16F84A programmable processing chip. Motor control circuit 310 provides drive signals to positional motors 230, 240 and 250 for moving panels 224-227 and panel mounting frame 211 responsive to the detected position of the sun. Outdoor air temperature sensors 302 and 303 are placed on opposite ends 57 and 59 of house 50. Indoor air temperature sensor 304 may be provided within control box 500 on an interior wall of the house 50.

Figure 6:
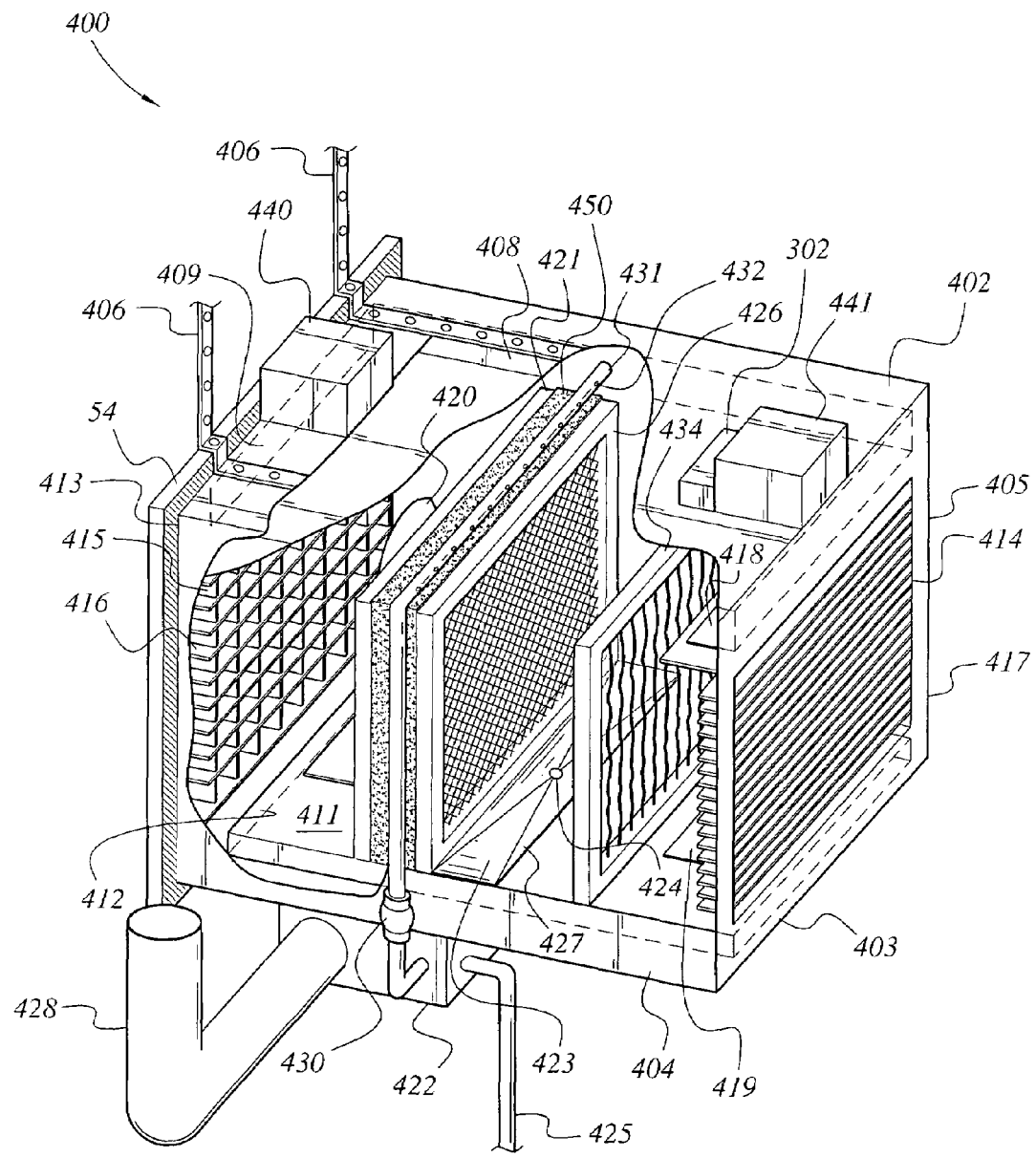
FIG. 6 is a perspective view of a ventilation assembly for the heating and cooling system that can be configured with both heating and cooling, just heating, or just cooling according to the present invention.

Turning now to FIG. 6, ventilation assembly 400 is shown positioned over a window or opening 52 in the eastern end wall 57 of house 50. Assembly 400 has a box-shaped metal housing 401 having a top wall 402 and a bottom wall 403 connected to the sidewalls 405 and 406. A tubular ventilation chamber 408 is attached to top wall 402 having an open end 409 and a closed end. Open end 409 of ventilation chamber 408 is adjacent inner open end 413 of housing 401 and the closed end of chamber 408 is adjacent outer open end 412 of housing 401. An upper vent door 418 is formed near the closed end of chamber 408. A tubular ventilation chamber 411 is attached to bottom wall 403. Chamber 411 has an open end 412 adjacent the inner open end 413 of housing 401 and a closed end adjacent outer open end 414 of housing 401. A lower vent door 419 is formed near the closed end of chamber 411. In the space between ventilation chambers 408 and 411 the various components of ventilation system 400 are mounted.

Referring further to FIG. 6, a vertical set of blinds 415 and a horizontal set of blinds 416 are mounted in the inner open end 413 of housing 401. Blinds 415 and 416 are actuated by a motor 440 attached to the top wall 402 to direct air from system 400 upward, downward, to the left and to the right into the interior room of house 50. A reversible fan 420 is mounted on a support frame 421 positioned behind the blinds 415 and 416 for drawing outdoor air into outer open end 414 or blowing air from the interior room out through outer open end 414. An optional fresh air filter 450 can be mounted in housing 401 behind fan 420. Fresh air filter 450 may be any commercially available porous filter. Preferably, fresh air filter 450, if used, is configured as a "Cool Pad" filter provided by Research Products Corporation of Ariz.

An optional screen-type clean air filter 426 can be mounted in housing 401 behind fresh air filter 450. Filter 426, if used, is preferably configured as a commercially available filter like the "Pleat" filter provided by Dander Precision Aire. The floor 427 beneath clean air filter 450 is sloped toward a drain opening 424. Drain 424 opens into a water reservoir 422 positioned on the bottom wall 403 of housing 401. An inlet pipe 425 connects reservoir 422 to the water supply of house 50. An outlet pipe 431 is positioned above fresh air filter 450 and is connected to reservoir 422.

When the ventilation assembly 400 is configured with cool air components, an electrically controlled pump 430 is provided to circulate water from reservoir 422 through spray apertures 432 in outlet pipe 431 onto the clean air filter 450 to cool the air passing through clean air filter 450. An angular open pipe 428 is also connected to reservoir 422 for placing ice cubes into reservoir 422 to further cool the air passing through filter 450. To heat the air entering the house 50 an electrical heating element 434 is mounted in the housing 401 behind the clean air filter 426. A set of horizontal blinds 417 is positioned behind heating element 434 so as to close the outer open end 414 of housing 401.

An electrical motor 441 is secured onto the top wall 402 of housing 401 adjacent to the outer open end 414. Motor 441 is mechanically connected to the upper vent door 418, lower vent door 419 and blinds 417. Motor 441 selectively positions the vent doors 418 and 419 and blinds 417 so that outside air is drawn into the ventilation assembly 400 or inside air is drawn into the vent chambers 408 and 411 and re-circulated into house 50 through inner end 413. Upper brackets 406 and lower brackets 407 secure assembly 400 to end wall 57 over opening 52. The brackets 406 and 407 are generally L-shaped with an angular portion for securing a rectangular frame of insulation material 54 around opening 52 to provide seal between end wall 57 of house 50 and the inner end 413 of housing 401.

Figure 7:
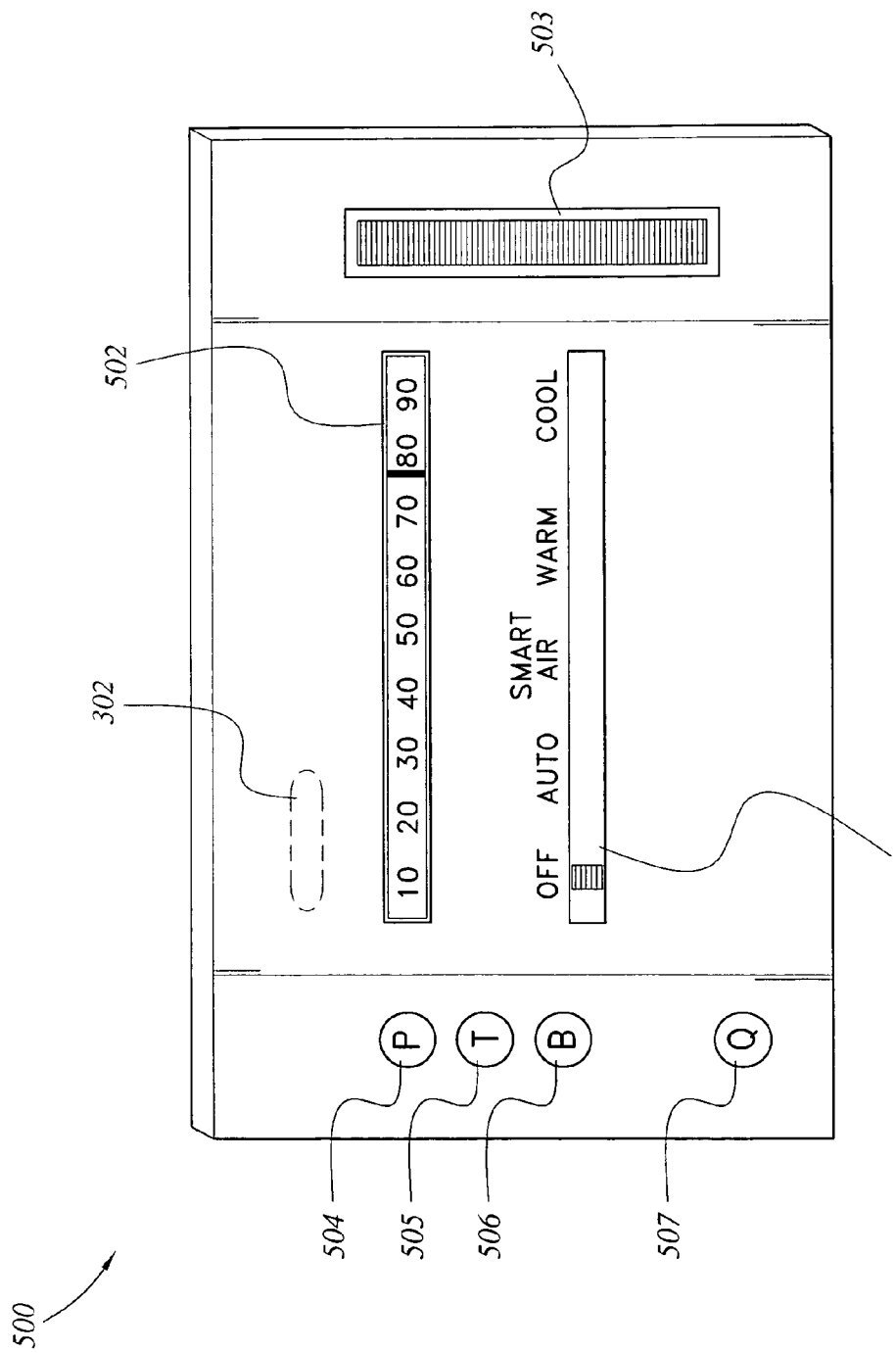
FIG. 7 is a perspective view of an indoor control box of the heating and cooling system according to the present invention.

Turning now to FIG. 7, the indoor system control box 500 includes indoor temperature sensor 302, a control switch 501, a thermostat 502, thermostat setting control 503, test lights 504-506 and a test button 507. Control switch 501 has OFF, AUTO, SMART AIR, WARM, and/or COOL mode selections. Test lights 504-506 indicate the status of the heating and cooling system 100 when the test button 507 is pushed to allow one to troubleshoot the heating and cooling system 100. Light 504 is actuated when the solar panel assembly 200 is producing power but the sun tracking assembly 300 is not operating properly. Test light 505 is lit to indicate that the sun tracking assembly 300 is operating properly but the solar panel assembly 200 is not producing power. Test light 506 is illuminated to indicate that both the solar panel assembly 300 and the sun tracking assembly are functioning properly.

Figure 8:
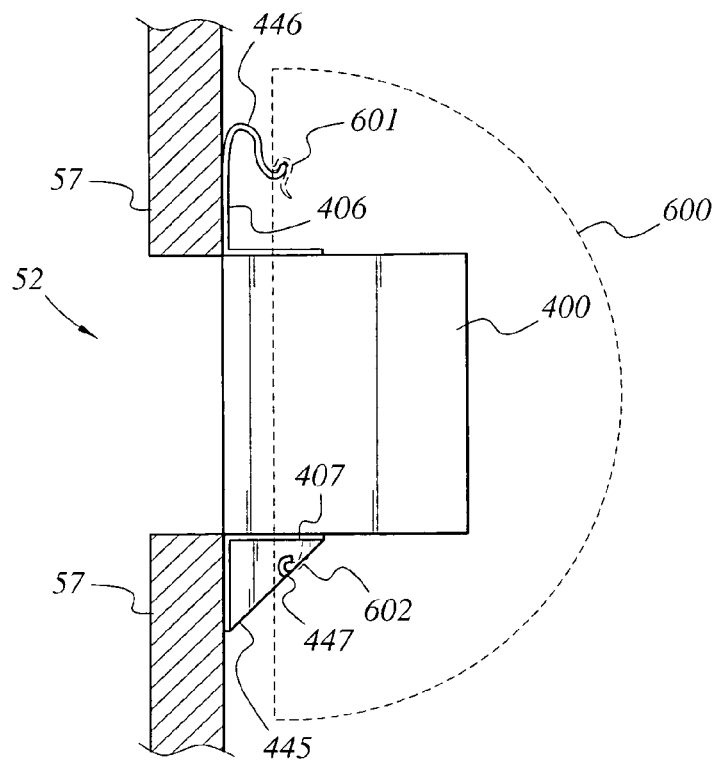
FIG. 8 is a side view of the ventilation assembly according to the present invention showing brackets securing the assembly to a wall of a dwelling and mounting a decorative dome-shaped cover over the ventilation assembly.
Figure 9:
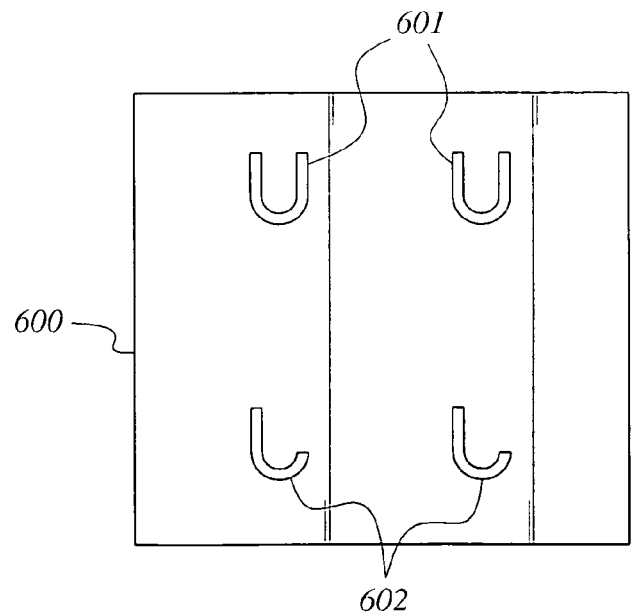
FIG. 9 is an inside view of the dome-shaped cover according to the present invention.

In FIG. 8, the dome 600 is shown in phantom lines affixed over ventilation assembly 400 the to hide its appearance. When the dome 600 is to be used, upper brackets 406 are provided with a hooked end portion 446 and lower brackets 407 is provided with a strengthening web 445 with a hook portion 447 thereon. The dome 600 is provided with upper connectors 601 and lower connectors 602 as is shown in FIG. 9. Connectors 601 and 602 cooperate with hooked end portions 446 of the upper brackets 406 and the hook portions 447 of lower brackets 407 respectively to securely fix the dome 600 over the ventilation assembly. The dome is positioned so as to have suitable clearance between the end wall 57 of house 50 and the rim of dome 600 to allow fresh air to be drawn into the ventilation assembly 400.

FIGS. 10A-10E show a flowchart 700 of the control logic used by processing unit 301 when two ventilator assemblies 400, hereinafter referred to as unit one 400 and unit two 400, are installed on house 50 as shown in FIG. 1. The processing unit 301 receives inputs $T_{S1}$, $T_{S2}$, $T_{INSIDE}$, $T_{MIN}$, and $T_{MAX}$ (step 702). $T_{S1}$ is the outside temperature sensed by temperature sensor 302 at unit one 400. $T_{S2}$ is the outside temperature sensed by temperature sensor 303 at unit two 400. $T_{INSIDE}$ is the inside temperature of the house sensed at the control box 500. $T_{MAX}$ is a preset maximum indoor temperature and $T_{MIN}$ is a preset minimum indoor temperature.

An evaluation of the control box setting is then made (step 704). A determination is then made whether the control switch 501 is set to the OFF, AUTO, SMART AIR, WARM, and/or COOL mode selections. If the control switch 501 is set to the OFF mode (step 706), the control logic cycles back through steps 702 and 704. If the control switch 501 is set to the AUTO mode (step 708), the AUTO mode is activated (step 710) and the control logic executes the AUTO mode process 800 shown in FIG. 10B. In the AUTO mode process 800, a determination is made whether $T_{INSIDE}$ is less than $T_{MIN}$ (step 810) and whether $T_{INSIDE}$ is greater than $T_{MAX}$ (step 830). If $T_{INSIDE}$ is less than $T_{MIN}$ (step 810) the WARM AIR mode is activated (step 820) and the control logic executes the WARM AIR mode process 1000 shown in FIG. 10D. If $T_{INSIDE}$ is greater than $T_{MAX}$ (step 830) the COOL AIR mode is activated (step 840) and the control logic executes the COOL AIR mode process 1200 shown in FIG. 10E. If $T_{INSIDE}$ is not less than $T_{MIN}$ and $T_{INSIDE}$ is not greater than $T_{MAX}$ the control logic cycles back through the steps in flowchart 700 in FIG. 10A.

Figure 10A:
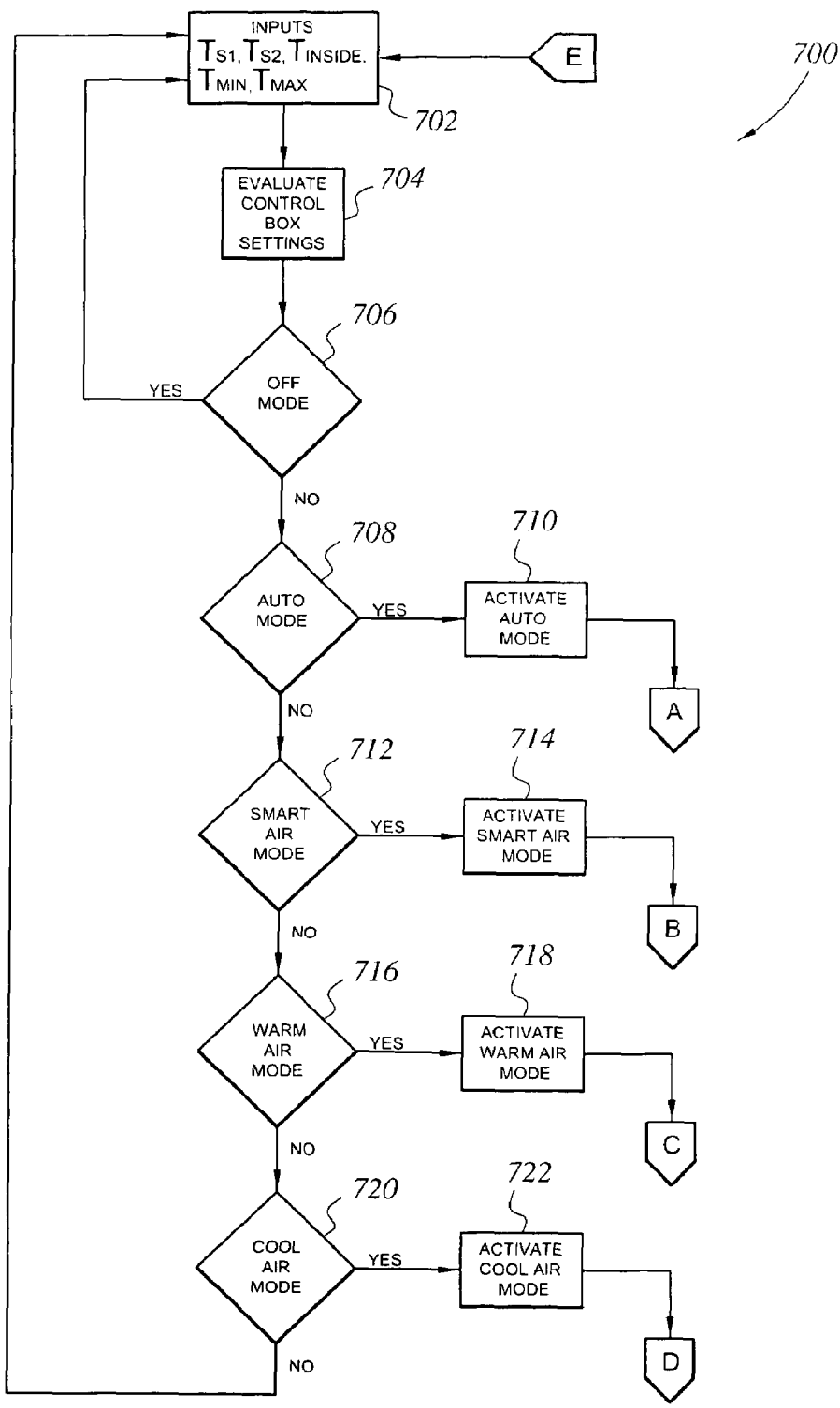
FIGS. 10A, 10B, 10C, 10D, and 10E show a flowchart of the control logic used in operating the heating and cooling system according to the present invention.
Figure 10B:
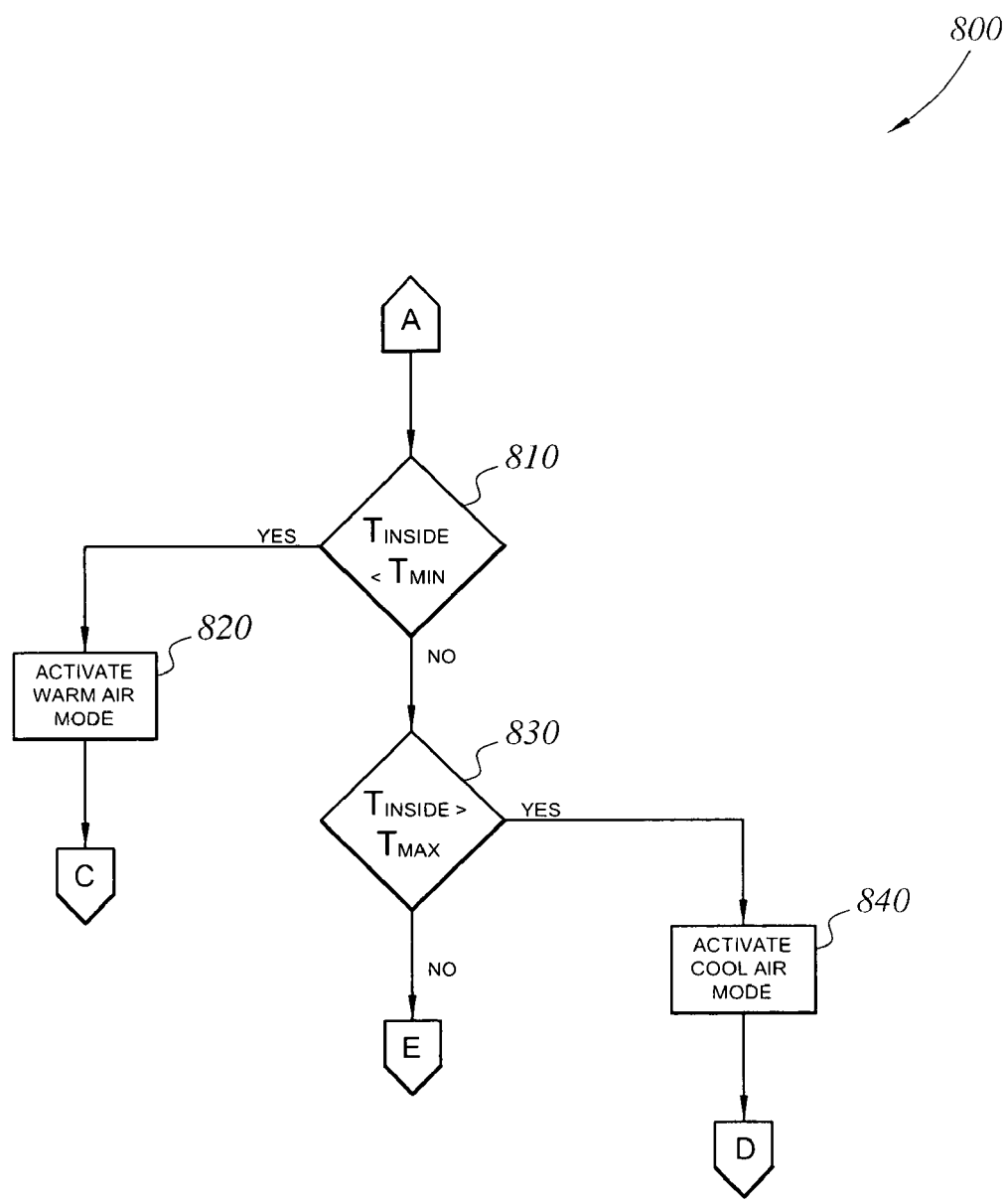
Figure 10C:
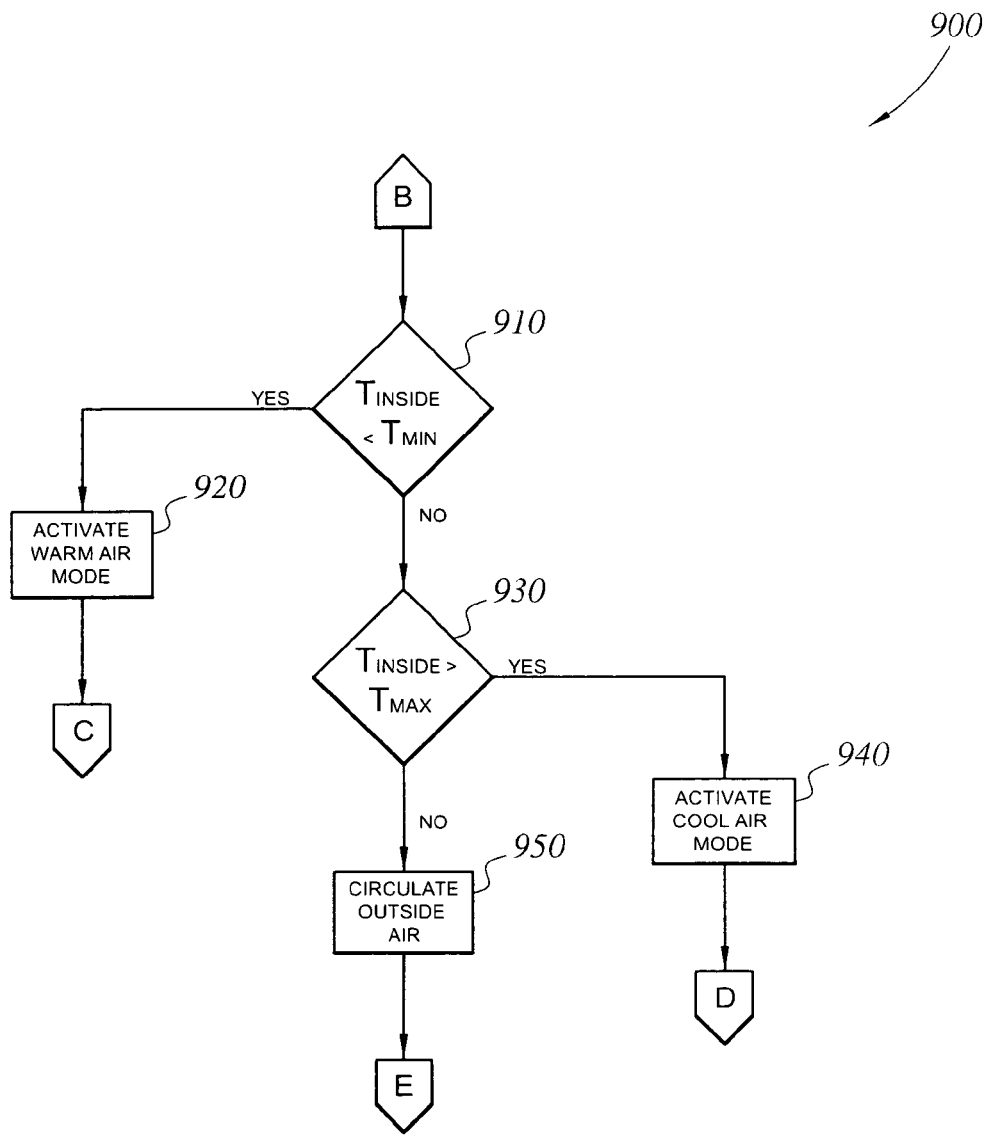

If the control switch 501 is set to the SMART AIR mode (step 712), the SMART AIR mode is activated (step 714) and the control logic executes the SMART AIR mode process 900 shown in FIG. 10C. In the SMART AIR mode process 900, a determination is made whether $T_{INSIDE}$ is less than $T_{MIN}$ (step 910) and whether $T_{INSIDE}$ is greater than $T_{MAX}$ (step 930). If $T_{INSIDE}$ is less than $T_{MIN}$ (step 910) the WARM AIR mode is activated (step 920) and the control logic executes the WARM AIR mode process 1000 shown in FIG. 10D. If $T_{INSIDE}$ is greater than $T_{MAX}$ (step 930) the COOL AIR mode is activated (step 940) and the control logic executes the COOL AIR mode process 1200 shown in FIG. 10E. If $T_{INSIDE}$ is not less than $T_{MIN}$ and $T_{INSIDE}$ is not greater than $T_{MAX}$ the control logic causes outside air to circulate through the space (step 950) and then cycles back through the steps in flowchart 700 in FIG. 10A.

When the control logic causes outside air to circulate through the space, one of the two units 400 sets their fan 420 in the FORWARD direction and blows the outside air through the space, and the other unit 400 sets their fan in the REVERSE direction and blows the circulated outside air out of the space. For example, unit one 400 could be set such that its fan 420 is set in the FORWARD direction to blow outside air through the space, and unit two 400 could be set such that its fan 420 is set in the REVERSE direction to blow the circulated outside air out of the space. When this occurs, the water reservoir 422 of unit one 400 is filled if needed by the pump 430 via 425 of unit one 400. Alternatively, unit two 400 could be set such that its fan 420 is set in the FORWARD direction to blow outside air through the space, and unit one 400 could be set such that its fan 420 is set in the REVERSE direction to blow the circulated outside air out of the space. When this occurs, the water reservoir 422 of unit two 400 is filled if needed by the pump 430 via 425 of unit two 400.

Figure 10D:
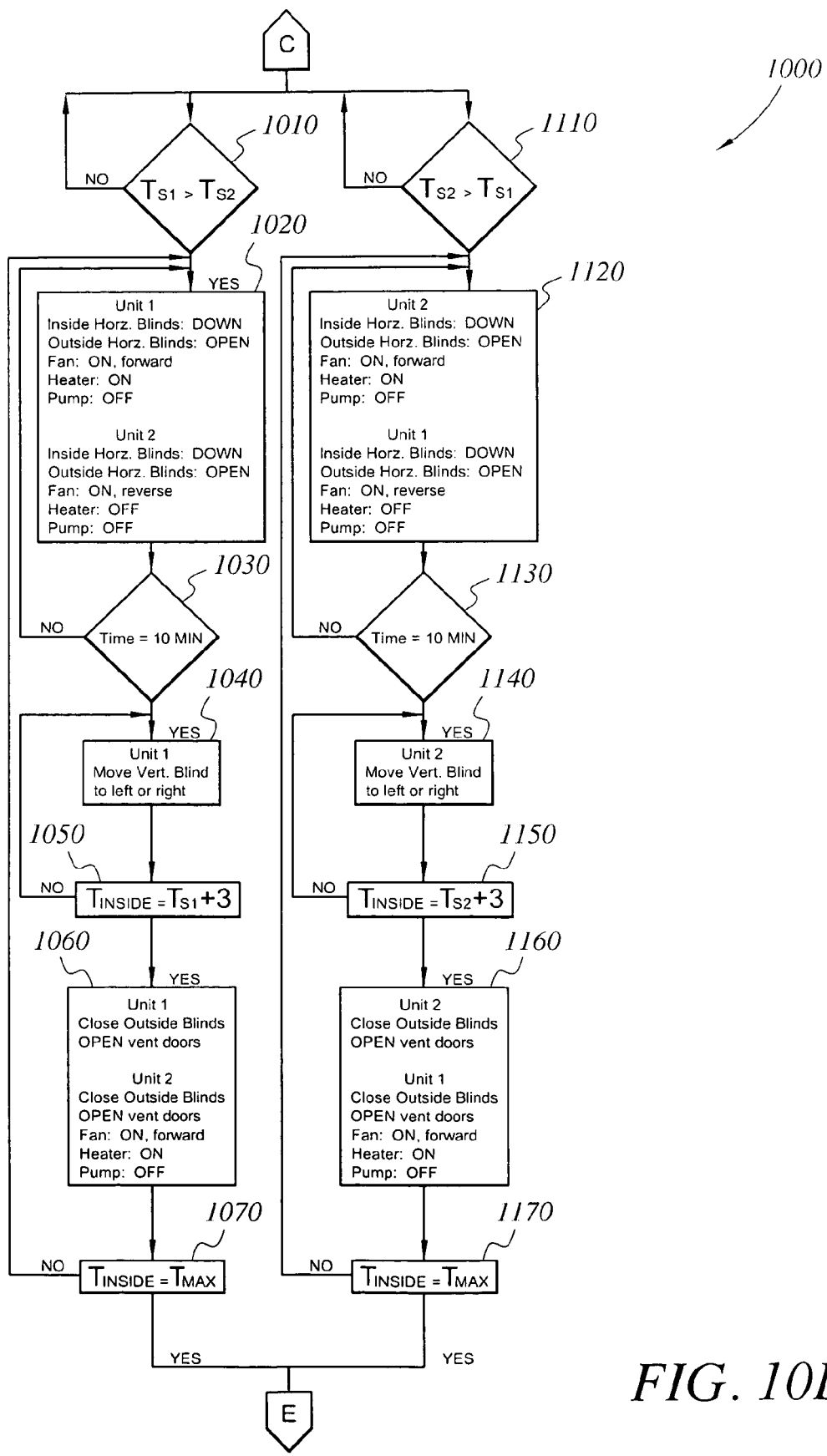

Referring to the WARM AIR process 1000 shown in FIG. 10D, a determination is made whether $T_{S1}$ is greater than $T_{S2}$ (step 1010) or if $T_{S2}$ is greater than $T_{S1}$ (step 1110). If $T_{S1}$ is equal to $T_{S2}$, no changes are made to the settings of any of the blinds 414-416, vent doors 418 and 419, fan 420, pump 430 and heater 434 of either unit one 400 or unit two 400. The control logic then cycles back through the steps in flowchart 700 in FIG. 10A.

If $T_{S1}$ is greater than $T_{S2}$ (step 1010) the control logic continues executing the WARM AIR mode. For unit one 400, for a predetermined amount of time, such as ten minutes or the like, the inside horizontal blinds 416 are turned DOWN, the outside horizontal blinds 417 are OPENED, the fan 420 is turned ON in the FORWARD direction, the heater 434 is turned ON, and the pump 430 is turned OFF (step 1020). For unit two 400, for the same predetermined amount of time, the inside horizontal blinds 416 are turned DOWN, the outside horizontal blinds 417 are OPENED, the fan 420 is turned ON in the REVERSE direction, and the heater 434 and pump 430 are turned OFF (step 1020).

A determination is made as to whether the predetermined amount of time has passed (step 1030). If the predetermined amount of time has not passed, no changes are made to the settings of unit one 400 and unit two 400. If the predetermined amount of time has passed, the vertical blinds 415 of unit one 400 may alternately move in the left or right direction (step 1040). A determination is then made whether $T_{INSIDE}$ is equal to a predetermined amount of degrees greater than $T_{S1}$, such as three degrees or the like (step 1050). If $T_{INSIDE}$ is not equal to the predetermined amount of degrees greater than $T_{S1}$, the vertical blinds 415 of unit one 400 may alternately move in the left or right direction (step 1040) and no changes are made to the settings of unit two 400.

If $T_{INSIDE}$ is equal to a predetermined amount of degrees greater than $T_{S1}$, for unit one 400, the outside horizontal blinds 417 are CLOSED, and the vent doors 418 and 419 are OPENED (step 1060). If $T_{INSIDE}$ is equal to the predetermined amount of degrees greater than $T_{S1}$, for unit two 400, the outside horizontal blinds 417 are CLOSED, and the vent doors 418 and 419 are OPENED, the fan 420 is turned ON in the FORWARD direction, the heater 434 is turned ON, and the pump 430 is turned OFF (step 1060). A determination is then made whether $T_{INSIDE}$ equals $T_{MIN}$ (step 1070). If $T_{INSIDE}$ does not equal $T_{MIN}$ no changes are made to the settings of unit one 400 and unit two 400, and steps 1020, 1030, 1040, 1050, 1060 and 1070 of the WARM AIR process 1000 are repeated. If $T_{INSIDE}$ equals $T_{MIN}$ the control logic then cycles back through the steps in flowchart 700 in FIG. 10A.

If $T_{S2}$ is greater than $T_{S1}$ (step 1110) the control logic continues executing the WARM AIR mode. For unit two 400, for a predetermined amount of time, such as ten minutes or the like, the inside horizontal blinds 416 are turned DOWN, the outside horizontal blinds 417 are OPENED, the fan 420 is turned ON in the FORWARD direction, the heater 434 is turned ON, and the pump 430 is turned OFF (step 1120). For unit one 400, for the same predetermined amount of time, the inside horizontal blinds 416 are turned DOWN, the outside horizontal blinds 417 are OPENED, the fan 420 is turned ON in the REVERSE direction, and the heater 434 and pump 430 are turned OFF (step 1120).

A determination is made as to whether the predetermined amount of time has passed (step 1130). If the predetermined amount of time has not passed, no changes are made to the settings of unit one 400 and unit two 400. If the predetermined amount of time has passed, the vertical blinds 415 of unit two 400 may alternately move in the left or right direction (step 1140). A determination is then made whether $T_{INSIDE}$ is equal to a predetermined amount of degrees greater than $T_{S2}$, such as three degrees or the like (step 1150). If $T_{INSIDE}$ is not equal to the predetermined amount of degrees greater than $T_{S2}$, the vertical blinds 415 of unit two 400 may alternately move in the left or right direction (step 1140) and no changes are made to the settings of unit one 400.

If $T_{INSIDE}$ is equal to a predetermined amount of degrees greater than $T_{S1}$, for unit one 400, the outside horizontal blinds 417 are CLOSED, and the vent doors 418 and 419 are OPENED (step 1160). If $T_{INSIDE}$ is equal to the predetermined amount of degrees greater than $T_{S1}$, for unit two 400, the outside horizontal blinds 417 are CLOSED, and the vent doors 418 and 419 are OPENED, the fan 420 is turned ON in the FORWARD direction, the heater 434 is turned ON, and the pump 430 is turned OFF (step 1160). A determination is then made whether TINSIDE equals $T_{MIN}$ (step 1170). If $T_{INSIDE}$ does not equal $T_{MIN}$ no changes are made to the settings of unit one 400 and unit two 400, and steps 1120, 1130, 1140, 1150, 1160 and 1170 of the WARM AIR process 1000 are repeated. If $T_{INSIDE}$ equals $T_{MIN}$ the control logic then cycles back through the steps in flowchart 700 in FIG. 10A.

Figure 10E:
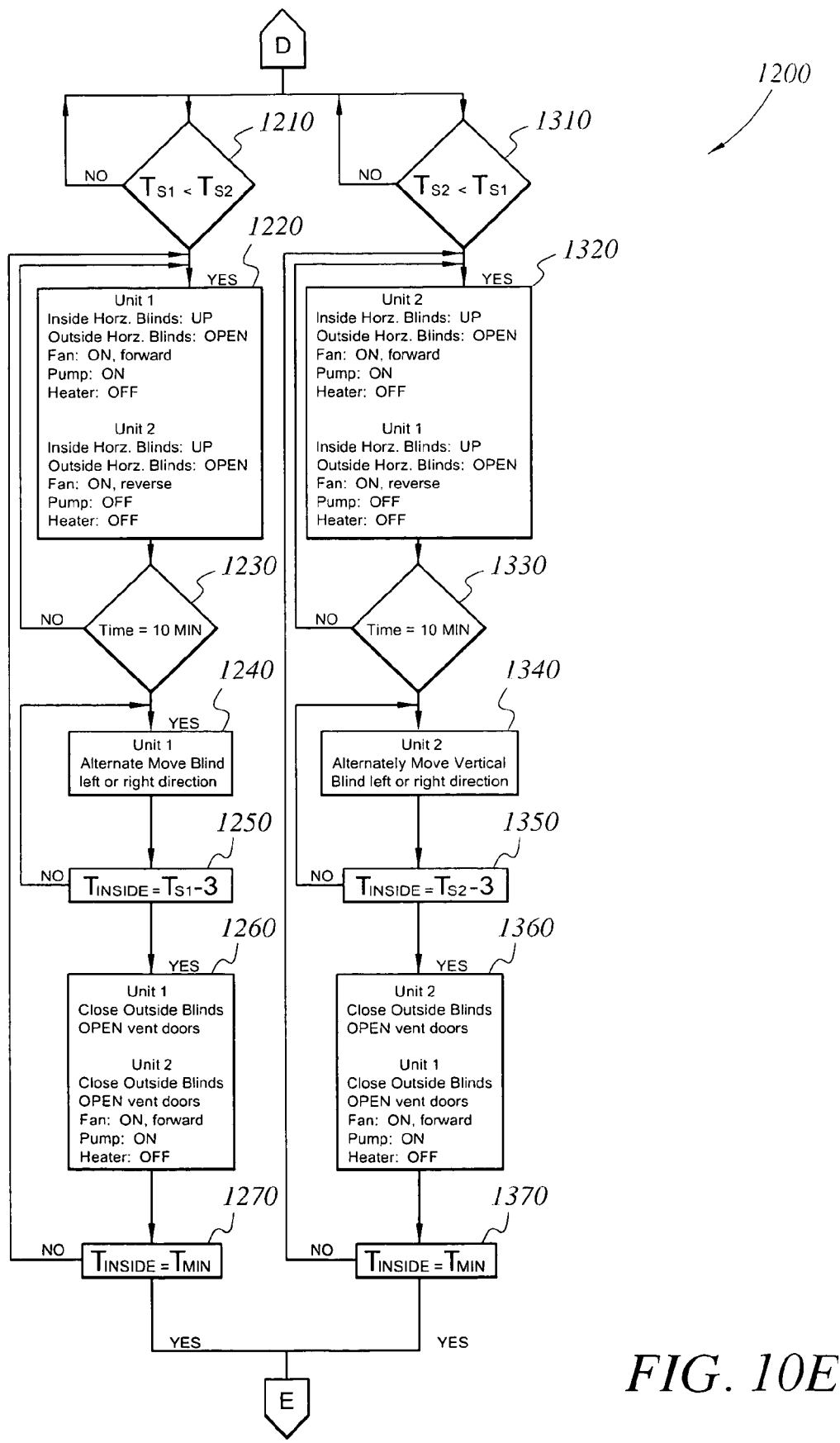

Referring to the COOL AIR process 1200 shown in FIG. 10E, if $T_{S1}$ is less than $T_{S2}$, the control logic continues to operate in the COOL AIR mode. For unit one 400, for a predetermined amount of time, such as ten minutes or the like, the inside horizontal blinds 416 are raised up, the outside horizontal blinds 417 are OPENED, the fan 420 is turned ON in the FORWARD direction, the pump 430 is turned ON and the reservoir 422 is filled if needed via 425, and the heater 434 is turned OFF (step 1220). For unit two 400, for the same predetermined amount of time, the inside horizontal blinds 416 are raised UP, the outside horizontal blinds 417 are OPENED, the fan 420 is turned ON in the REVERSE direction, and the pump 430 and the heater 434 are turned OFF (step 1220).

A determination is made as to whether the predetermined amount of time has passed (step 1230). If the predetermined amount of time has not passed, no changes are made to the settings of unit one 400 and unit two 400. If the predetermined amount of time has passed, the vertical blinds 415 of unit one 400 may alternately move in the left or right direction (step 1240). A determination is then made whether $T_{INSIDE}$ is equal to a predetermined amount of degrees lower than $T_{S1}$, such as three degrees or the like (step 1250). If $T_{INSIDE}$ is not equal to a predetermined amount of degrees lower than $T_{S1}$, the vertical blinds 415 of unit one 400 may alternately move in the left or right direction (step 1240) and no changes are made to the settings of unit two 400.

If $T_{INSIDE}$ is equal to the predetermined amount of degrees lower than $T_{S1}$, for unit one 400, the outside horizontal blinds 417 are CLOSED, and the vent doors 418 and 419 are OPENED (step 1260). If $T_{INSIDE}$ is equal to a predetermined amount of degrees lower than $T_{S1}$, for unit two 400, the outside horizontal blinds 417 are CLOSED, and the vent doors 418 and 419 are OPENED, the fan 420 is turned ON in the FORWARD direction, the pump 430 is turned ON and the reservoir 422 is filled if needed via 425, and the heater 434 is turned OFF (step 1260). A determination is then made whether $T_{INSIDE}$ equals $T_{MIN}$ (step 1270). If $T_{INSIDE}$ does not equal $T_{MIN}$ no changes are made to the settings of unit one 400 and unit two 400, and steps 1220, 1230, 1240, 1250, 1260 and 1270 of the COOL AIR process 1200 are repeated. If $T_{INSIDE}$ equals $T_{MIN}$ the control logic then cycles back through the steps in flowchart 700 in FIG. 10A.

If $T_{S2}$ is less than $T_{S1}$, the control logic continues to operate in the COOL AIR mode. For unit two 400, for a predetermined amount of time, such as ten minutes or the like, the inside horizontal blinds 416 are raised UP, the outside horizontal blinds 417 are OPENED, the fan 420 is turned ON in the FORWARD direction, the pump 430 is turned ON, and the heater 434 is turned OFF (step 1320). For unit one 400, for the same predetermined amount of time, the inside horizontal blinds 416 are raised UP, the outside horizontal blinds 417 are OPENED, the fan 420 is turned ON in the REVERSE direction, and the pump 430 and the heater 434 are turned OFF (step 1320).

A determination is made as to whether the predetermined amount of time has passed (step 1330). If the predetermined amount of time has not passed, no changes are made to the settings of unit one 400 and unit two 400. If the predetermined amount of time has passed, the vertical blinds 415 of unit two 400 may alternately move in the left or right direction (step 1340). A determination is then made whether $T_{INSIDE}$ is equal to a predetermined amount of degrees lower than $T_{S2}$, such as three degrees or the like (step 1350). If $T_{INSIDE}$ is not equal to a predetermined amount of degrees lower than $T_{S1}$, the vertical blinds 415 of unit two 400 may alternately move in the left or right direction (step 1340) and no changes are made to the settings of unit one 400.

If $T_{INSIDE}$ is equal to a predetermined amount of degrees lower than $T_{S2}$, for unit two 400, the outside horizontal blinds 417 are CLOSED, and the vent doors 418 and 419 are OPENED (step 1360). If $T_{INSIDE}$ is equal to a predetermined amount of degrees lower than $T_{S2}$, for unit one 400, the outside horizontal blinds 417 are CLOSED, the vent doors 418 and 419 are OPENED, the fan 420 is turned ON in the FORWARD direction, the pump 430 is turned ON and the reservoir 422 is filled if needed via 425, and the heater 434 is turned OFF (step 1360). A determination is then made whether $T_{INSIDE}$ equals $T_{MIN}$ (step 1370). If $T_{INSIDE}$ does not equal $T_{MIN}$ no changes are made to the settings of unit one 400 and unit two 400, and steps 1320, 1330, 1340, 1350, 1360 and 1370 of the COOL AIR process 1200 are repeated. If $T_{INSIDE}$ equals $T_{MIN}$ the control logic then cycles back through the steps in flowchart 700 in FIG. 10A.

The processing unit 301 may be programmed to control one, two and/or more ventilator assemblies 400. As demonstrated by the flowchart 700, processing unit 301 automatically controls the operation of the blinds 414-416, vent doors 418 and 419, fan 420, pump 430 and heater 434 of each ventilator assembly 400 based upon the preset maximum and minimum indoor temperatures and sensed outdoor temperatures.

In summary, a heating and cooling system according to the present invention includes a positionable solar panel assembly having a plurality of solar panels. The solar panel assembly is configured to supply power to power consuming components of the heating and cooling system. A sun tracking assembly is interconnected to the solar panel assembly. The sun tracking assembly is configured to continually detect a position of the sun and provide control signals to adjust a position of the plurality of solar panels of the solar panel assembly to follow the movement of the sun during a day, and to reposition the plurality of solar panels for following the sun a subsequent day. At least one ventilation assembly is configured to controllably supply heated and cooled air into a space, evacuate air from the space, re-circulate air from the space, and/or circulate outside air in the space in response to control signals from the sun tracking assembly. A system control is interconnected to the solar panel assembly and the sun tracking assembly. The system control is configured to selectively control operation and testing of the at least one ventilation assembly, and is configured to operate in an OFF, AUTO, SMART AIR, WARM AIR, and/or COOL AIR mode selection.

The heating and cooling system can have a dome attachable to the at least one ventilation system to provide an aesthetic covering for the at least one ventilation assembly. The solar panel assembly has a solar panel mounting frame with a bottom side and an elongated rectangular metal frame member having corner flanges, a bottom side, and a topside. The bottom side of the frame member is pivotally attached to the bottom side of the solar panel mounting frame.

Each solar panel of the plurality of solar panels has an upper end, a lower end, and opposing sides. A first linking bar is pivotally interconnected with one side of a lower end of each solar panel of the plurality of solar panels. A second linking bar is pivotally interconnected to the opposing side of upper end of each solar panel of the plurality of solar panels. Each solar panel of the plurality of solar panels has a snap-on rear surface for spilling wind in areas having high winds.

The heating and cooling system can have a first repositioning motor with a drive gear, where the first repositioning motor is affixed to the mounting frame. One of the plurality of solar panels has a hemispherical gear centrally affixed the rear surface of the one solar panel. The hemispherical gear meshes with the drive gear of the first positioning motor to cause the plurality of solar panels to pivot back and forth in response to actuation of the first positioning motor to follow daily movements of the sun.

The heating and cooling system can have a second repositioning motor affixed to the mounting frame. One of the plurality of solar panels has a hemispherical gear centrally affixed the rear surface of the one solar panel. The hemispherical gear meshing with the drive gear of the second positioning motor to cause the plurality of solar panels to pivot back and forth in response to actuation of the first positioning motor to follow daily movements of the sun.

The system control has a processing unit that can be a programmable micro-processing chip. The processing unit is configured to provide drive signals to positional motors for moving the solar panels and mounting frame in response to detected positions of the sun. The heating and cooling system can have an indoor air temperature sensor, an outdoor temperature sensor, inside and outside blinds, vent doors, a fan, a pump, a heater, and test lights.

While the invention has been described with references to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

I claim:

1. A heating and cooling system comprising:
    a positionable solar panel assembly having a plurality of solar panels, the solar panel assembly being configured to supply power to power consuming components of the heating and cooling system;
    a sun tracking assembly interconnected to the solar panel assembly, the sun tracking assembly being configured to continually detect a position of the sun and provide control signals to adjust a position of the plurality of solar panels of the solar panel assembly to follow the movement of the sun during a day, and to reposition the plurality of solar panels for following the sun a subsequent day;
    at least one ventilation assembly configured to controllably supply heated and cooled air into a space, evacuate air from the space, re-circulate air from the space, or circulate outside air through the space in response to control signals from the sun tracking assembly; and
    a system control interconnected to the solar panel assembly and the sun tracking assembly, the system control being configured to selectively control operation and testing of the at least one ventilation assembly, and being configured to operate in an OFF, AUTO, SMART AIR, WARM AIR or COOL AIR mode selection.

2. The heating and cooling system according to claim 1, further comprising a dome attachable to the at least one ventilation assembly to provide an aesthetic covering for the at least one ventilation assembly.

3. The heating and cooling system according to claim 1, wherein the solar panel assembly further comprises:
    a solar panel mounting frame with a bottom side; and
    an elongated rectangular metal frame member having corner flanges, a bottom side, and a topside,
    wherein the bottom side of the frame member is pivotally attached to the bottom side of the solar panel mounting frame.

4. The heating and cooling system according to claim 3, wherein each solar panel of the plurality of solar panels has an upper end, a lower end, and opposing sides.

5. The heating and cooling system according to claim 4, further comprising a first linking bar pivotally interconnected with one side of a lower end of each solar panel of the plurality of solar panels.

6. The heating and cooling system according to claim 5, further comprising a second linking bar pivotally interconnected to the opposing side of upper end of each solar panel of the plurality of solar panels.

7. The heating and cooling system according to claim 4, wherein each solar panel of the plurality of solar panels has a snap-on rear surface for spilling wind in areas having high winds.

8. The heating and cooling system according to claim 7, further comprising a first repositioning motor with a drive gear, the first repositioning motor being affixed to the mounting frame.

9. The heating and cooling system according to claim 8, wherein the rear surface of one of the plurality of solar panels has a hemispherical gear centrally affixed the rear surface of the one solar panel, the hemispherical gear meshing with the drive gear of the first positioning motor to cause the plurality of solar panels to pivot back and forth in response to actuation of the first positioning motor to follow daily movements of the sun.

10. The heating and cooling system according to claim 8, further comprising a second repositioning motor affixed to the mounting frame.

11. The heating and cooling system according to claim 10, wherein the rear surface of one of the plurality of solar panels has a hemispherical gear centrally affixed the rear surface of the one solar panel, the hemispherical gear meshing with the drive gear of the second positioning motor to cause the plurality of solar panels to pivot back and forth in response to actuation of the first positioning motor to follow daily movements of the sun.

12. The heating and cooling system according to claim 1, wherein the system control comprises a processing unit.

13. The heating and cooling system according to claim 12, wherein the processing unit is a programmable microprocessing chip.

14. The heating and cooling system according to claim 13, wherein the processing unit is configured to provide drive signals to positional motors for moving the solar panels and mounting frame in response to detected positions of the sun.

15. The heating and cooling system according to claim 14, wherein the system control further comprises an indoor air temperature sensor and an outdoor temperature sensor.

16. The heating and cooling system according to claim 15, further comprising inside and outside blinds, vent doors, a fan, a pump, and a heater.

17. The heating and cooling system according to claim 16, further comprising a water reservoir.

18. The heating and cooling system according to claim 16, further comprising test lights.

* * * * *